United States Patent
Vikberg et al.

(10) Patent No.: US 10,517,123 B2
(45) Date of Patent: Dec. 24, 2019

(54) RADIO NETWORK NODE, NETWORK NODE AND METHODS PERFORMED THEREIN

(71) Applicant: TELEFONAKTIEBOLAGET LM ERICSSON (PUBL), Stockholm (SE)

(72) Inventors: Jari Vikberg, Järna (SE); Göran Hall, Mölndal (SE); Mattias Wahlqvist, Madrid (ES)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 15/776,126

(22) PCT Filed: Nov. 18, 2015

(86) PCT No.: PCT/SE2015/051243
§ 371 (c)(1),
(2) Date: May 15, 2018

(87) PCT Pub. No.: WO2017/086848
PCT Pub. Date: May 26, 2017

(65) Prior Publication Data
US 2018/0332632 A1    Nov. 15, 2018

(51) Int. Cl.
*H04W 4/00*  (2018.01)
*H04W 76/10*  (2018.01)
*H04W 48/08*  (2009.01)

(52) U.S. Cl.
CPC ........... *H04W 76/10* (2018.02); *H04W 48/08* (2013.01)

(58) Field of Classification Search
CPC ... H04W 48/18; H04W 84/042; H04W 16/10; H04W 28/06; H04W 72/0453; H04W 76/10; H04W 76/27
See application file for complete search history.

(56) References Cited

U.S. PATENT DOCUMENTS

2014/0086177 A1* 3/2014 Adjakple .............. H04W 12/08
370/329

OTHER PUBLICATIONS

Ericsson, "5G systems", Ericsson White Paper, Jan. 1, 2015, pp. 1-14, XP-002759845.
Ericsson, "Network functions virtualization and software management", Ericsson White Paper, Dec. 1, 2014, pp. 1-9, XP-002759844.
NGMM, "NGMM 5G White Paper", 3GPP draft, NGMM 5G White Paper V1 0, May 22, 2015, pp. 1-125.
International Search Report and Written Opinion, dated Jul. 22, 2016, from corresponding PCT Application No. PCT/SE2015/051243.

* cited by examiner

*Primary Examiner* — Khalid W Shaheed
(74) *Attorney, Agent, or Firm* — Patent Portfolio Builders, PLLC

(57) ABSTRACT

Embodiments herein relate to a method performed by a network node for enabling communication between the network node and a radio network node comprised in a communication network. The network node supports a first set of functionalities out of a total set of functionalities in the communication network, which first set of functionalities is separated from a different set of functionalities out of the total set of functionalities in the communication network. The network node initiates a transmission of an indication to the radio network node, which indication indicates the supported first set of functionalities.

27 Claims, 13 Drawing Sheets

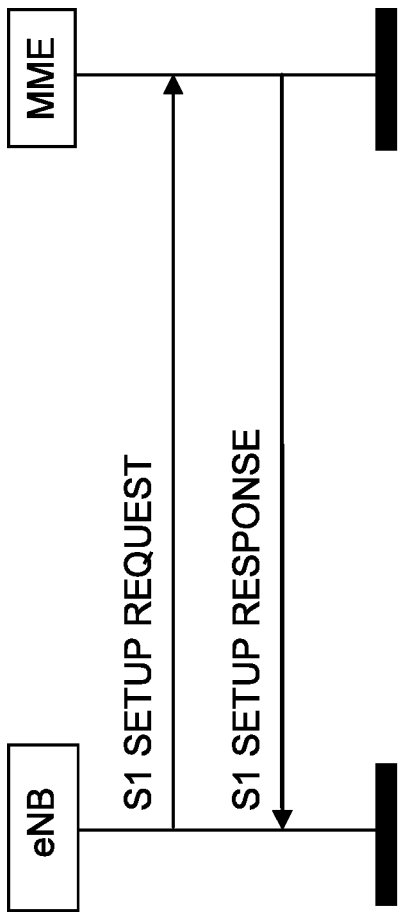
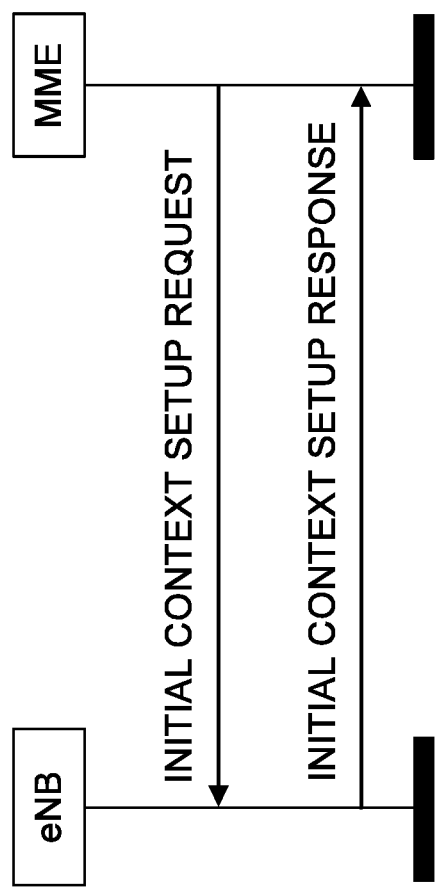

RADIO NETWORK NODE, NETWORK NODE AND METHODS PERFORMED THEREIN

TECHNICAL FIELD

Embodiments herein relate to a radio network node, a network node and methods performed therein for communication. Furthermore, a computer program and a computer readable storage medium are also provided herein. In particular, embodiments herein relate to enabling communication with a radio network node comprised in a communication network.

BACKGROUND

In a typical communication network, wireless devices, also known as wireless communication devices, mobile stations, stations (STA) and/or user equipments (UE), communicate via a Radio Access Network (RAN) to one or more core networks. The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain and comprises the EPC and E-UTRAN. FIG. 1 is an overview of the EPC architecture. This architecture is defined in 3GPP TS 23.401 v.13.4.0 wherein a definition of a Packet Data Network Gateway (PGW), a Serving Gateway (SGW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
  S1-interface management functions such as S1 setup, error indication, reset and the radio network node and MME configuration update.
  UE Context Management functionality such as Initial Context Setup Function and UE Context Modification Function.
  E-UTRAN Radio Access Bearer (E-RAB) Service Management function e.g. Setup, Modify, Release.
  Mobility Functions for wireless devices in EPS Connection Management (ECM)-CONNECTED, e.g. Intra-LTE Handover and inter-3GPP-Radio Access Technology (RAT) Handover.
  S1 Paging function.
  Non Access Stratum (NAS) Signaling Transport function.
  Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 4. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. Current assumption is that the RAN-CN split is similar for 5G as for 4G, implying an (evolved) S1 interface. An INITIAL CONTEXT SETUP RESPONSE message is sent by eNB to the MME confirming the setup.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of that mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator service and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimize the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
  Evolved communication services
  Cloud services
  Extended mobility and coverage
Mission critical Machine Type Communication
  Intelligent traffic systems
  Smart grid
  Industrial applications
Massive Machine Type Communication
  Sensors/actuators
  Capillary networks
Media
  Efficient on-demand media delivery
  Media awareness
  Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of Enterprise services
Government services, e.g. national safety
Verticals industries, e.g. automation, transportation
Residential users These different users and services are also expected to put new requirements on the network. FIG. 5 shows an example of a network slicing for a case when there exists different network slices in the core network for MBB, Massive MTC and Critical MTC.

Network slicing introduces the possibility that the network slices are used for different services and use cases and there is a need to enable usage of these services for wireless devices in the communication network to improve the performance of services of the communication network.

SUMMARY

An object of embodiments herein is to provide a mechanism for improving performance of services in the communication network in an efficient manner.

According to an aspect the object is achieved by a method performed by a network node for enabling communication between the network node and a radio network node comprised in a communication network. The network node supports a first set of functionalities out of a total set of functionalities in the communication network, which first set of functionalities is separated from a different set of functionalities out of the total set of functionalities in the communication network. The network node initiates a transmission of an indication to the radio network node, which indication indicates the supported first set of functionalities.

According to another aspect the object is achieved by a method performed by a radio network node for enabling communication between the radio network node and a network node comprised in a communication network. The radio network node receives a transmission of an indication from the network node, which indication indicates a supported first set of functionalities out of a total set of functionalities in the communication network. The first set of functionalities is separated from a different set of functionalities out of the total set of functionalities in the communication network.

According to yet another aspect the object is achieved by providing a network node for enabling communication between the network node and a radio network node comprised in a communication network. The network node is configured to support a first set of functionalities out of a total set of functionalities in the communication network, which first set of functionalities is separated from a different set of functionalities out of the total set of functionalities in the communication network. The network node is configured to initiate a transmission of an indication to the radio network node, which indication indicates the supported first set of functionalities.

According to still another aspect the object is achieved by providing a radio network node for enabling communication between the radio network node and a network node comprised in a communication network. The radio network node is configured to receive a transmission of an indication from the network node, which indication indicates a supported first set of functionalities out of a total set of functionalities in the communication network. The first set of functionalities is separated from a different set of functionalities out of the total set of functionalities in the communication network.

It is furthermore provided herein a computer program comprising instructions, which, when executed on at least one processor, cause the at least one processor to carry out any of the methods above, as performed by the network node or the radio network node. It is additionally provided herein a computer-readable storage medium, having stored thereon a computer program comprising instructions which, when executed on at least one processor, cause the at least one processor to carry out the method according to any of the methods above, as performed by the network node or the radio network node.

Embodiments herein introduce a new functionality to indicate to the radio network node which functionality is supported in the network slice. This enables that the network slice does not need to support all possible functionality defined for all network slices, thereby improving the performance of the communication network in an efficient manner.

BRIEF DESCRIPTION OF THE DRAWINGS

Embodiments will now be described in more detail in relation to the enclosed drawings, in which:

FIG. 3 is a signalling scheme according to prior art;

FIG. 4 is a signalling scheme according to prior art;

DETAILED DESCRIPTION

Figure 1:
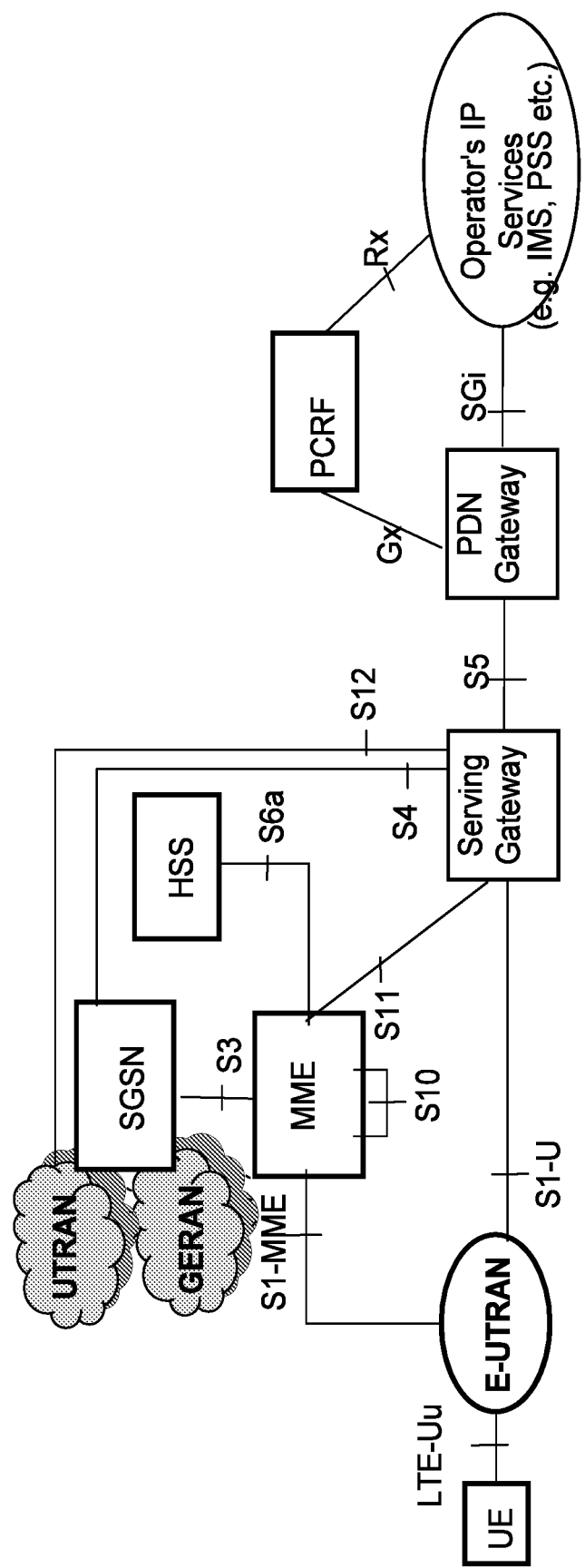
FIG. 1 is a schematic overview depicting a communication network according to prior art.
Figure 2:
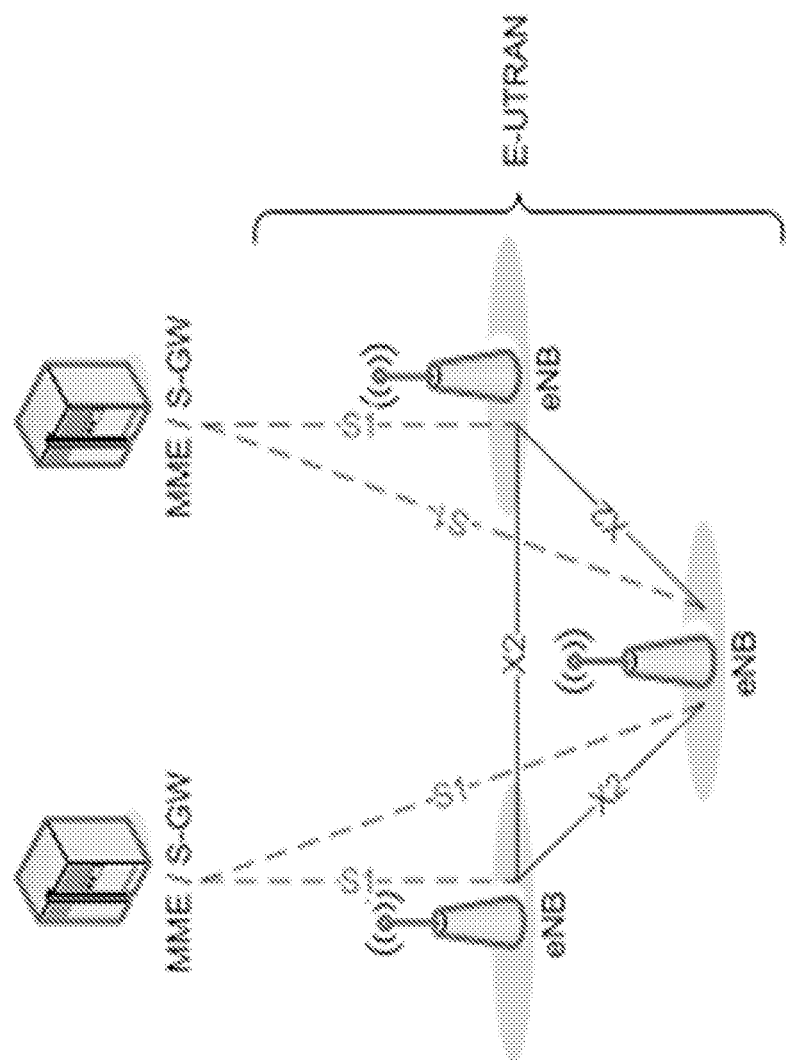
FIG. 2 is a schematic overview depicting a radio access network in connection with a core network.
Figure 5:
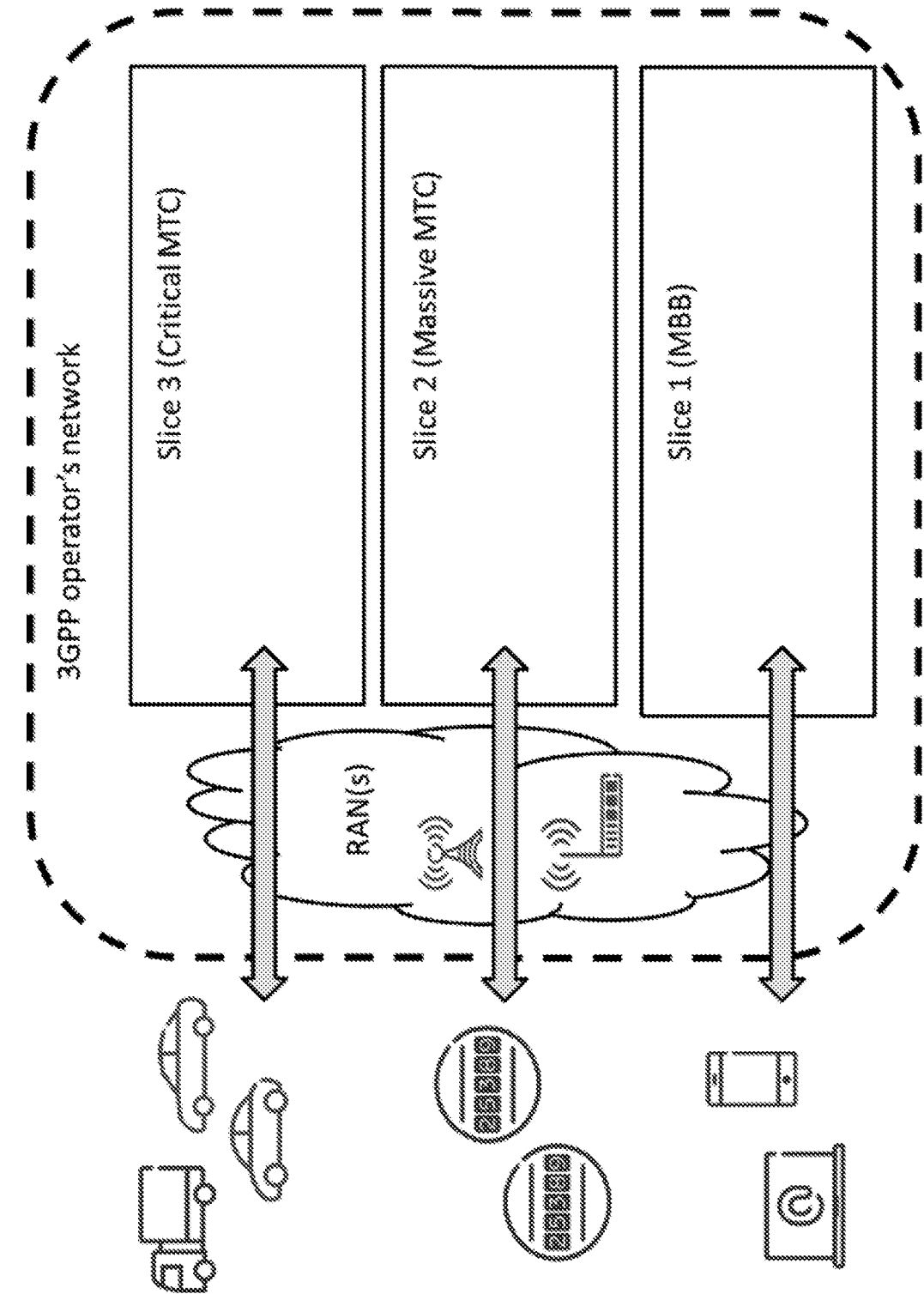
FIG. 5 is a schematic overview depicting an example of a slicing of a core network according to prior art.
Figure 6:
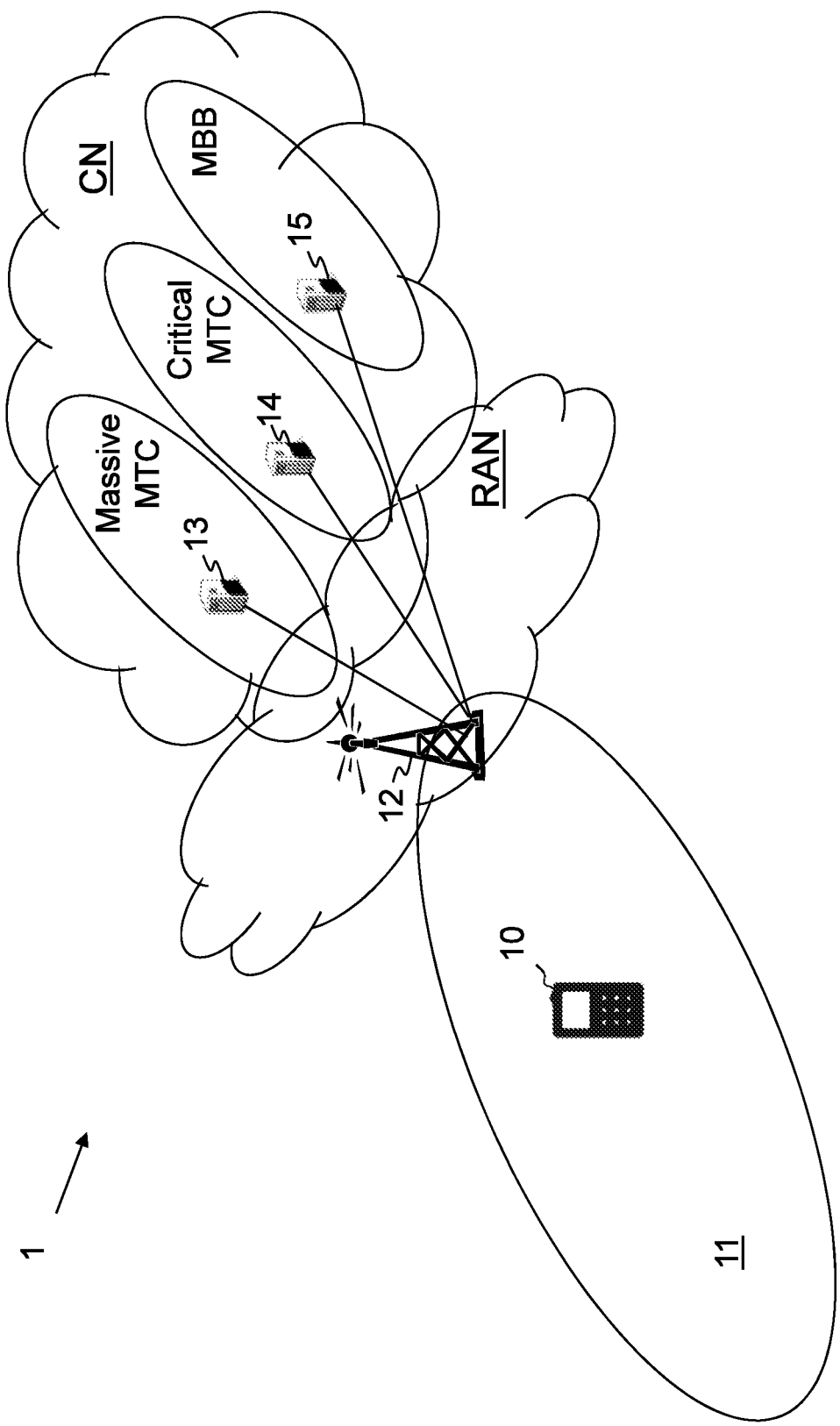
FIG. 6 is a schematic overview depicting a communication network 1 according to embodiments herein.

Embodiments herein relate to communication networks in general. FIG. 6 is a schematic overview depicting a communication network 1. The communication network 1 comprises one or more RANs and one or more CNs. The communication network 1 may use a number of different technologies, such as W-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. WCDMA and LTE.

In the communication network 1, wireless devices e.g. a wireless device 10 such as a mobile station, a non-access point (non-AP) STA, a STA, a user equipment and/or a wireless terminals, communicate via one or more Access Networks (AN), e.g. RAN, to one or more core networks (CN). It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a radio network node 12 providing radio coverage over a geographical area, a first service area, of a first radio access technology (RAT), such as LTE, UMTS, Wi-Fi or similar. The radio network node 12 may be a radio access network node such as radio network controller or an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the first radio access technology and terminology used.

Furthermore, the communication network 1 comprises a core network (CN) virtually network sliced into a number of network slices, each network slice or core network slice supports a type of wireless devices and/or a type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise a network node. For example, a first network slice for e.g. massive MTC devices may comprise a first network node 13. A second network slice for e.g. critical MTC devices may comprise a second network node 14. A third network slice for e.g. MBB devices may comprise a third network node 15. Each network slice supports a set of functionalities out of a total set of functionalities in the communication network. E.g. the first network node 13 supports a first set of functionalities out of the total set of functionalities in the communication network 1. The first set of functionalities is separated from a different set of functionalities out of the total set of functionalities in the communication network 1. E.g. the first set of functionalities being associated with Massive MTC devices is separated or logically separated, e.g. using separated data storage or processing resources, from a second set of functionalities of the second network slice. The network node illustrated herein is exemplified as the first network node 13 but does also cover the second and third network nodes.

The first set of functionalities may use one or more resources in a core network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network node may be separated from other network nodes supporting a second set of functionalities out of the total set of functionalities in the communication network. Separated meaning herein physical separated wherein the network nodes may be executed on different hardware platforms and therefore using different resources of the hardware, and logically separated wherein the network nodes may be executed on a same hardware platform and use different resources such as memory parts or resources of processor capacity but may also use some same resources of the hardware e.g. a single physical network node may be partitioned into multiple virtual network nodes.

Hence, the first network node 13 supports the first set of functionalities out of the total set of functionalities in the core network of the communication network, which first set of functionalities belongs to the first network slice of the core network, and is separated from another set of functionalities out of the total set of functionalities in the core network.

Embodiments herein provide a mechanism wherein the first network node 13 initiates a transmission of an indication to the radio network node 12, which indication indicates the supported first set of functionalities. Thus, each network node, e.g. the second network node 14 and the third network node 15 may transmit an own indication indicating their own set of functionalities respectively supported. Embodiments herein provide a mechanism for a network slice to indicate to the RAN which functionality is supported in the network slice and in the interface, such as S1-MME, between the RAN and the network slice. This would enable that the network slice doesn't need to support all possible functionality defined for all network slices. In some cases network slices may be able to handle multiple set of functionalities, i.e. the CN is not limited to functionality for one set of use case but may be able to handle multiple set of use cases if the operator prefers to set up the network slice(s) in such manner. Therefore the mechanism must also be able to carry information of support of functionality for multiple different use cases. In this case the first network node 13 supports a number of network slices and may initiate a transmission of multiple indications to the radio network node 12, wherein each indication indicates the supported first set of functionalities for each use case. Each use case is identified by an identifier, such as a network slice identifier for each of the multiple indications.

FIG. 6 shows an exemplary overall architecture according to embodiments herein. A single radio network node is shown on the RAN. According to embodiments herein the radio network node 12 may comprise a functionality denoted as an Adapter function. As stated above, each network slice, e.g. the first network node 13, indicates the supported set of functionalities to the Adapter function in the radio network node 12 using signaling e.g. over the S1-interface. The Adapter function adapts an S1 functionality according to the indication from the first network node 13. The Adapter function may be a single function instance for all S1-interfaces but it is also possible to have a separate Adapter function for each S1-interface and/or each network slice.

The indication of supported first set of functionalities may comprise information of any functionality visible in e.g. the S1-interface (including both S1-MME and S1-U).

A first example of such functionality in the first set of functionalities is active mode mobility support. The first network slice may support or the first set of functionalities may comprise:

Both S1- and X2-based handovers, which is the normal current level of support;

Only X2-based handover. This would have the benefit that the first network slice would not need to support any S1-based handover related functionality such as the relevant signaling on S1-interface and a handover routing function needed for S1-based handovers.

Only S1-based handover. This would have the benefit that the first network slice would not need to support any X2-based handover related functionality such as the relevant signaling on S1-interface.

No mobility support at all. This would have the benefit that the first network slice would not need to support any X2- or S1-based handover related functionality such as the relevant signaling on S1-interface and a handover routing function needed for S1-based handovers.

This is a non-exhaustive list of functionalities. There might be parts of the S1 and X2 handovers that could be supported/not supported. For example S1 handover without SGW relocation is a simpler procedure than full S1 handover as specified in the standard.

Another example of functionality support that could be indicated is related to the aspect of Control Plane (CP) and User Plane (UP) split. The first network slice may support or the first set of functionalities may comprise:

Both "CP/UP split" and "Combined CP/UP". This would be the normal current level of support once both options are standardized. The "CP/UP split" is at least partly supported already today over the S1-interface as control plane is based on the S1-MME interface between the eNB and the MME, and user plane is based on the S1-U interface between the eNB and the SGW. The "Combined CP/UP" means for example that both control and user plane are based on a single interface. One such example is to use the S1-MME for both user and control plane between the eNB and the MME. This may typically be used for wireless devices that transmit only a small amount of data, e.g. an electricity meter sending a small amount of data relatively seldom.

Only "CP/UP split". This would mean that the "Combined CP/UP" would not need to be supported on the core network side.

Only "Combined CP/UP". This would mean that the "CP/UP split" would not need to be supported on the core network side. One additional example for this case is that the network slice or the radio network node 12 may not need to support any EPS bearers or procedures to create UE contexts in the RAN for the S1-U interface.

The above examples are to be seen only as examples and an indication of supported the first set of functionalities may be used to indicate any functionality that is visible in the S1-interface.

By limiting the supported functionality on the S1 interface, S1-AP management procedures may be impacted as a consequence of the limiting, for example simplification of error handling, and/or which permutations of procedures/parameters that are allowed. This could also be explicitly signaled to the first network node 13 from relevant radio network node in a support indication indicating own set of functionalities supported by the radio network node 12.

Embodiments herein enable that network nodes or network slices support different set of functionalities for different services and use cases. This enables that e.g. the first network node 13 doesn't need to support all possible functionalities defined for all network nodes in the core network. This also means that the first network node 13 doesn't need to implement all specified functionality nor provide the support for any related configuration of such functionality. An additional advantage is that processing load can also be reduced for the first network node 13 as it doesn't need to support any redundant functionality. Embodiments herein enable a possibility to provide network slices optimized in different ways.

Embodiments herein introduce a new functionality both in the network node of the network slice and in the radio network node of the RAN to enable the network slice to indicate to the RAN which functionality is supported in the network slice. This enables that the network slice doesn't need to support all possible functionality defined for all network slices. The indication of the first set of functionalities on the S1-interface from the first network node 13 to the radio network node 12 may be on a network slice level, an S1-interface level or a wireless device level. The network slice level and S1-interface level functionalities enable the first network node 13 to not support specific functionalities. The wireless device level indication may not have this property as the first network node 13 may still need to support all functionality, although it would be different for different wireless devices. This wireless device level indication may still be useful as it may enable the internal structure of a network slice to be partitioned so that different parts support different functionality sets.

Figure 7A:
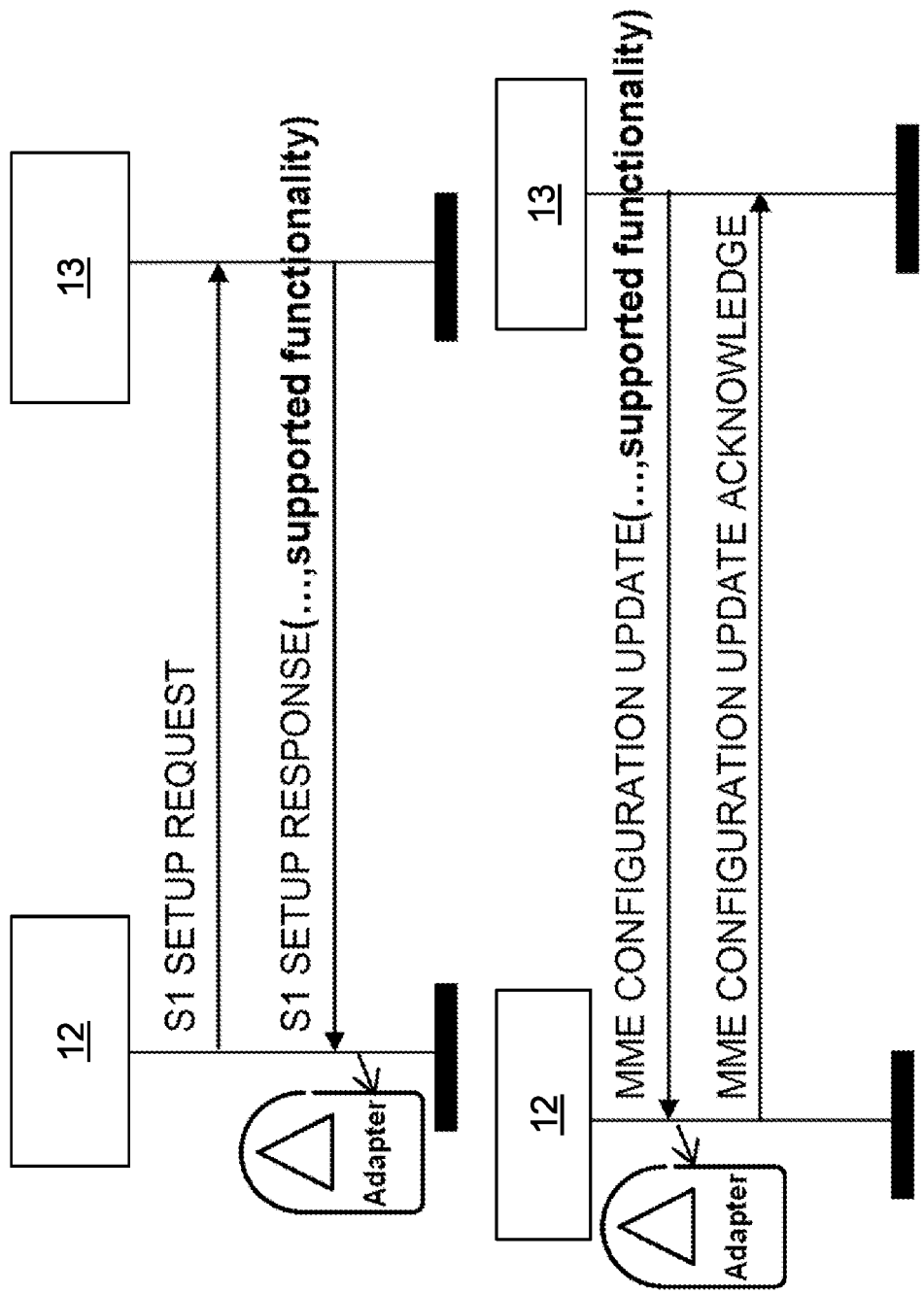
FIG. 7a is a signalling scheme according to some embodiments herein.

FIG. 7a shows two examples of network slice level indications as part of the S1 Setup and MME Configuration Update procedures. During S1 setup, the radio network node 12 may transmit an S1 setup request to the first network node 13. The first network node 13 may then initiate the transmission of a S1 setup response, which S1 setup response comprises the indication of the supported first set of functionalities. During MME Configuration Update, the first network node 13 may transmit an MME Configuration Update message comprising the indication of the supported first set of functionalities. The radio network node 12 may then respond with a MME Configuration Update acknowledge message.

Once the radio network node 12, e.g. the Adapter function of the radio network node, receives the indication indicating the supported first set of functionalities, it may be stored in an internal or external data structure and associated with the first network slice, the first network node 13 and/or a S1-interface. This association can be based on an identity identifying the first set of functionalities e.g. a first network slice identifier either included in the message together with the indication of supported first set of functionalities or it may be known to the radio network node 12 by other means such as during configuration. The stored information is used so that when an S1-interface is selected for the wireless device 10, the stored indication can be read or retrieved and used to decide which functionality is supported over that specific S1-interface. The S1-interface selection is normally performed by the Network Node Selection Function (NNSF) in the radio network node 12 that may have been enhanced to also support network slice selection.

Figure 7B:
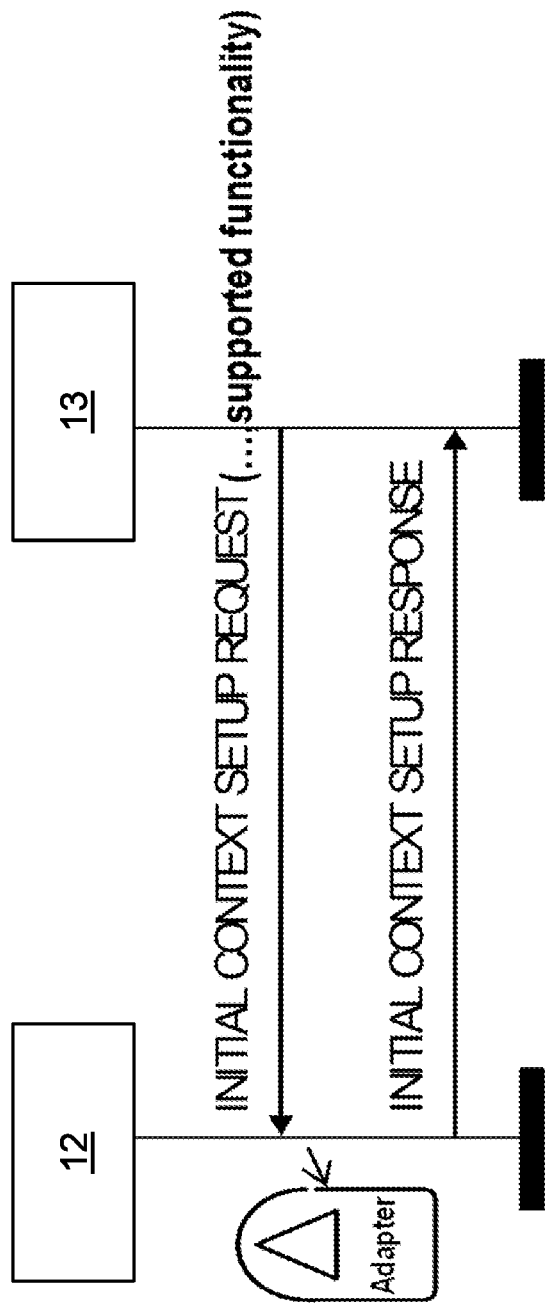
FIG. 7b is a signalling scheme according to some embodiments herein.

FIG. 7b shows one example of the wireless device level indication as part of the Initial Context Setup procedure. The first network node 13 may transmit an Initial Context Setup Request with the indication indicating the supported first set of functionalities. The radio network node 12 responds with an Initial Context Setup Response. Once the radio network node 12, e.g. the Adapter function of the radio network node 12, receives the indication of supported first set of functionalities, it is stored in an internal or external data structure and associated with a UE context related to the wireless device 10 for which the Initial Context Setup is triggered. The indication stored in the UE-context is used for any wireless device related signaling and user data transmission on the S1-interface.

Figure 8:
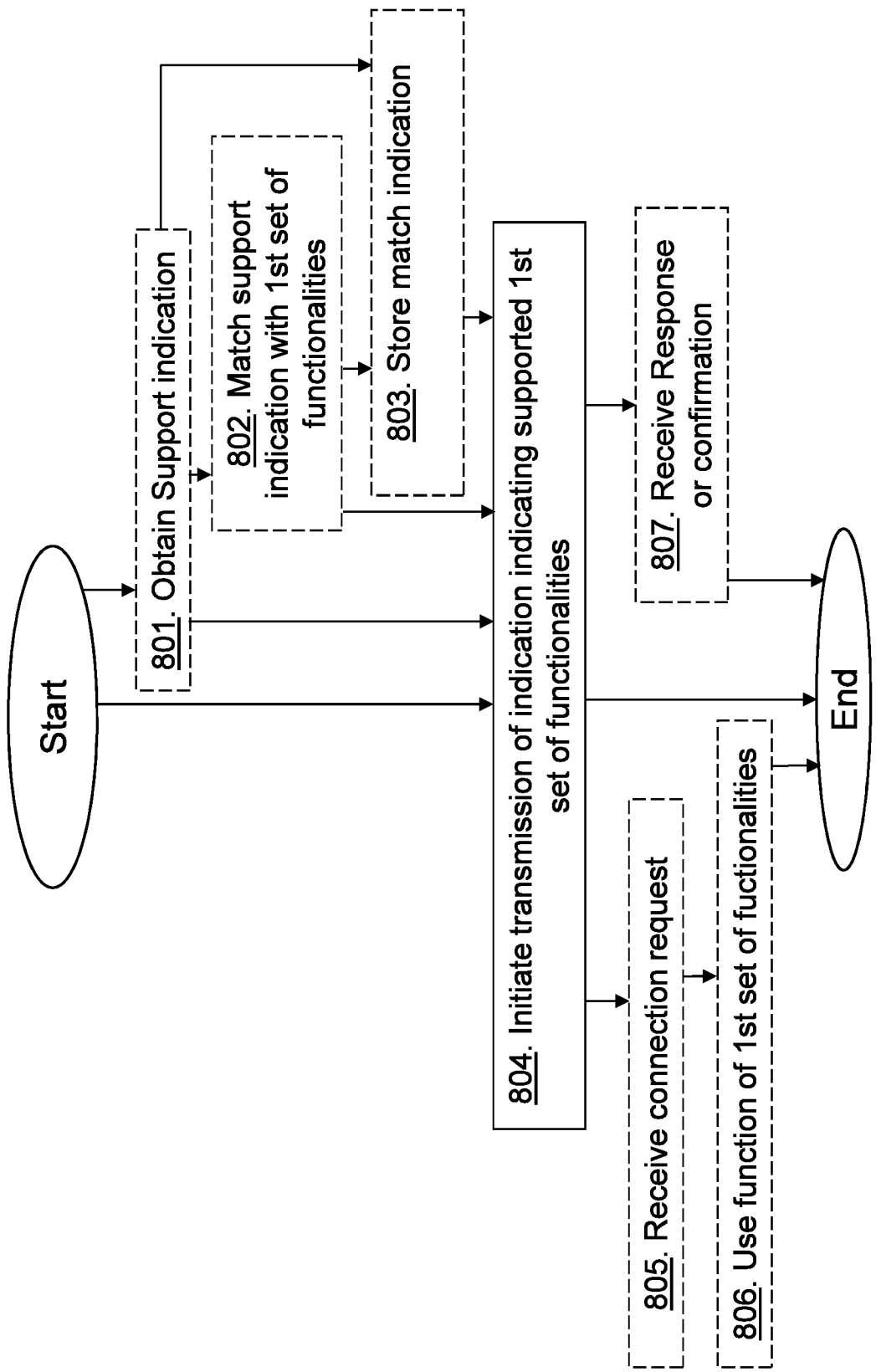
FIG. 8 is a schematic flowchart depicting a method performed by a network node according to embodiments herein.

The method actions in the network node, illustrated as the first network element 13 herein, for enabling communication between the network node 13 and the radio network node 12 comprised in a communication network according to embodiments herein will now be described with reference to a flowchart depicted in FIG. 8. The actions do not have to be taken in the order stated below, but may be taken in any suitable order. Actions performed in some embodiments are marked with dashed boxes. The first network node 13 supports the first set of functionalities out of the total set of functionalities in the communication network 1. As stated above the first set of functionalities is separated from a different set of functionalities out of the total set of functionalities in the communication network, i.e. the first network node 13 supports the first network slice separated from different network slices. The first set of functionalities may be associated with a certain type of wireless devices, a certain enterprise, a certain operator or a certain agreement. The first network node 13 may be a Mobility Managing Entity, a Serving GPRS Support Node (SGSN), or a corresponding node in e.g. a 5G network. GPRS meaning General Packet Radio Services.

Action 801. The first network node 13 may obtain a support indication of the radio network node 12, which support indication indicates an own set of functionalities supported by the radio network node 12. This may be received from the radio network node 12 or obtained during configuration.

Action 802. The first network node 13 may match the received support indication with the first set of functionalities. For example, in case the network node supports a number of network slices or sets of functionalities, the first network node 13 may receive the support indication indicating supported set of functionalities and select a set of functionalities, i.e. a network slice, which matches the supported set of functionalities. In another example, the radio network node 12 indicates support of multiple sets of functionalities and then the first network node 13 may match a part of the multiple sets with the first set and sends back the indication of the 1$^{st}$ set of functionalities, action 804 below.

Action 803. The first network node 13 may store a match indication indicating that the received support indication is matched with the first set of functionalities.

Action 804. The first network node 13 initiates the transmission of the indication to the radio network node 12. The indication indicates the supported first set of functionalities. E.g. in case the received support indication matches the first set of functionalities the first network node may perform the initiation of the transmission. The transmission may further comprise an identity identifying the first set of functionalities e.g. a network slice identifier. The first network node 13 may perform the initiation of the transmission during setup of the radio network node or upon a modification of the radio network node, e.g. during S1 setup or similar.

Action 805. The first network node 13 may receive a connection request for the wireless device 10 from the radio network node 12 for the first set of functionalities. The radio network node 12 may transmit to a function identifier identifying the first set of functionalities along the connection request. The function identifier may be a device type identifier, a network slice identifier, or any identifier indicating the first set of functionalities.

Action 806. The first network node 13 may then use at least one function of the first set of functionalities for the wireless device 10. For example, upon receiving the connection request for the wireless device 10 from the radio network node 12, the first network node 13 may check the stored match indication indicating that the received support indication is matched with the first set of functionalities and use at least one function of the first set of functionalities for the wireless device 10.

Action 807. The first network node 13 may further receive a response of confirmation, e.g. an S1 setup response.

Figure 9:
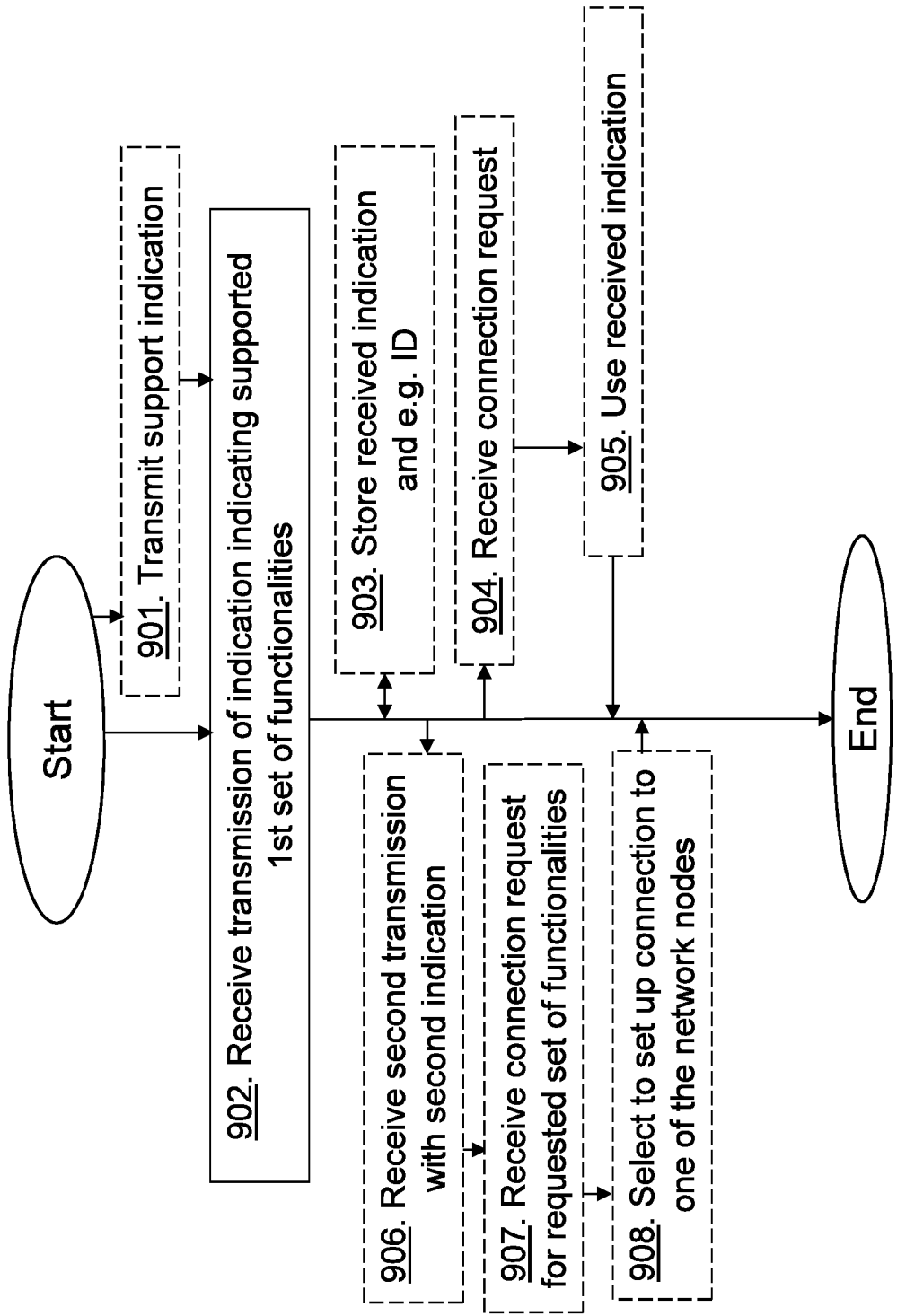
FIG. 9 is a schematic flowchart depicting a method performed by a radio network node according to embodiments herein.

The method actions in the radio network node 12 for enabling communication between the radio network node 12 and a network node, exemplified herein as the first network node 13, comprised in the communication network 1 according to embodiments herein will now be described with reference to a flowchart depicted in FIG. 9. The actions do not have to be taken in the order stated below, but may be taken in any suitable order. Actions performed in some embodiments are marked with dashed boxes.

Action 901. The radio network node 12 may support the own set of functionalities out of a total set of functionalities and the radio network node 12 may then transmit the support indication to the first network node 13. The support indication indicates the supported own set of functionalities.

Action 902. The radio network node 12 receives the transmission of the indication from the first network node 13, which indication indicates the supported first set of functionalities out of a total set of functionalities in the communication network 1. The first set of functionalities is separated from a different set of functionalities, e.g. the second set and the third set, out of the total set of functionalities in the communication network 1. The first set of functionalities may be associated with a certain type of wireless devices, a certain enterprise, a certain operator or a certain agreement.

Action 903. The radio network node 12 may store the received indication. The transmission may comprises the identity identifying the first set of functionalities, and the radio network node 12 may store the identity mapped to the first set of functionalities.

Action 904. The radio network node 12 may receive a connection request from the wireless device 10 for the first set of functionalities. The wireless device 10 may e.g. send to the radio network node 12 a connection request with an identifier identifying the first set of functionalities, the identifier may be a device type identifier, a network slice identifier, or any identifier indicating the first set of functionalities.

Action 905. The radio network node 12 may then use the received indication for enabling at least one function of the first set of functionalities for the wireless device as response to the connection request. E.g. use to set up a service for the wireless device 10 from the first network slice. The description so far has been about indicating functionality supported in the network slice. The same mechanism could also be used to control RAN-internal functionality to support a network slice. For example, if the first network node 13 indicates that no mobility is supported in the first network slice then the radio network node 12 may decide that even radio network node-internal mobility is not supported. This can then be used to not activate any functionality related to mobility, for example the radio network node 12 could decide to not perform any measurement reporting configuration for an wireless device attached to the first network slice not supporting mobility, or if the no mobility support was received on wireless device-level. Other examples of RAN-internal functionality impacted by the indication from the first network node 13 are carrier aggregation, dual connectivity, inter-carrier handover and Inter-RAT handover.

Action 906. The radio network node 12 may further receive a second transmission with a second indication from the second network node 14. The second indication indicates a supported second set of functionalities out of a total set of functionalities in the communication network 1. The second set of functionalities is separated from the first set of functionalities out of the total set of functionalities in the communication network 1. This may e.g. be performed during a S1 connection to the second network node 14.

Action 907. The radio network node 12 may receive a connection request from the wireless device 10 for a requested set of functionalities. The wireless device 10 may e.g. send to the radio network node 12 a connection request with an identifier identifying the requested set of functionalities, the identifier may be a device type identifier, a network slice identifier, or any identifier indicating the first set of functionalities.

Action 908. The radio network node 12 may then select to set up a connection to one of the network nodes based on the first, the second, and the requested set of functionalities.

Figure 10:
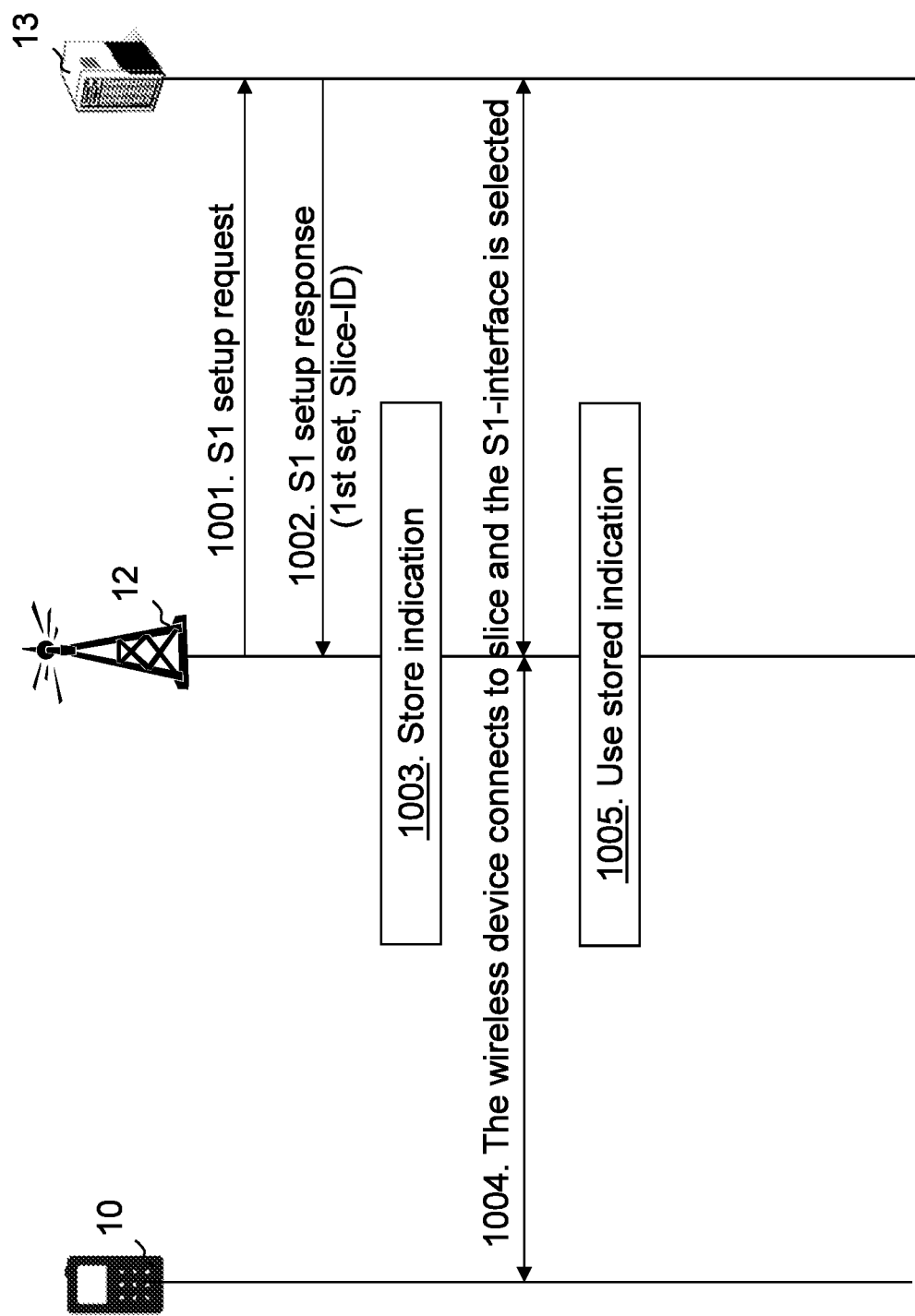
FIG. 10 is a combined flowchart and signalling scheme according to embodiments herein.

FIG. 10 is a combined flowchart and signalling scheme according to some embodiments herein exemplifying one embodiment herein.

In this example the first network slice of the first network node 13 is a single network slice, a Massive MTC network slice run by an operator 3. The RAN is run by an RAN operator and the radio network node comprises the Adapter function. This example is about network slice-level and S1-interface level indication about supported functionality.

Action 1001. When the radio network node 12 is taken into service, the radio network node 12 triggers the S1 Setup procedure towards one or more network nodes e.g. MMEs, by sending a S1 SETUP REQUEST.

Action 1002. Each network node, e.g. the first network node 13, responds to the S1 Setup procedure by returning a S1 SETUP RESPONSE message. The S1 SETUP RESPONSE message shown in the figure comprises the indication about supported first set of functionalities for this network slice and S1-interface. The message may also comprise an indication about the network slice identifier, the network slice-ID, of the network slice.

Action 1003. The radio network node 12 stores the received indication of the supported first set of functionalities and may associate this with the S1-interface for which the S1 Setup procedure was performed for. The association may also include the network slice identifier.

Action 1004. Then the wireless device 10 connects to the first network slice using the same S1-interface.

Action 1005. When the wireless device 10 connects to the first network slice the radio network node 12 uses the stored indication about the supported functionality to adapt to the first set of functionalities in the network slice.

There might be scenarios in where it could be beneficial for the RAN, i.e. the radio network node 12, to indicate to the network slice, i.e. the first network node 13, which functionality that could be supported by the radio network node 12. One example of this would be a specially deployed radio network node for a specific purpose, such as a radio network node covering a factory building or a radio network node deployed for providing emergency services in a disaster area. In those cases, the special built radio network node might include limitations on functionality, which could be informed to the network slice, e.g. the first network node 13.

Figure 11:
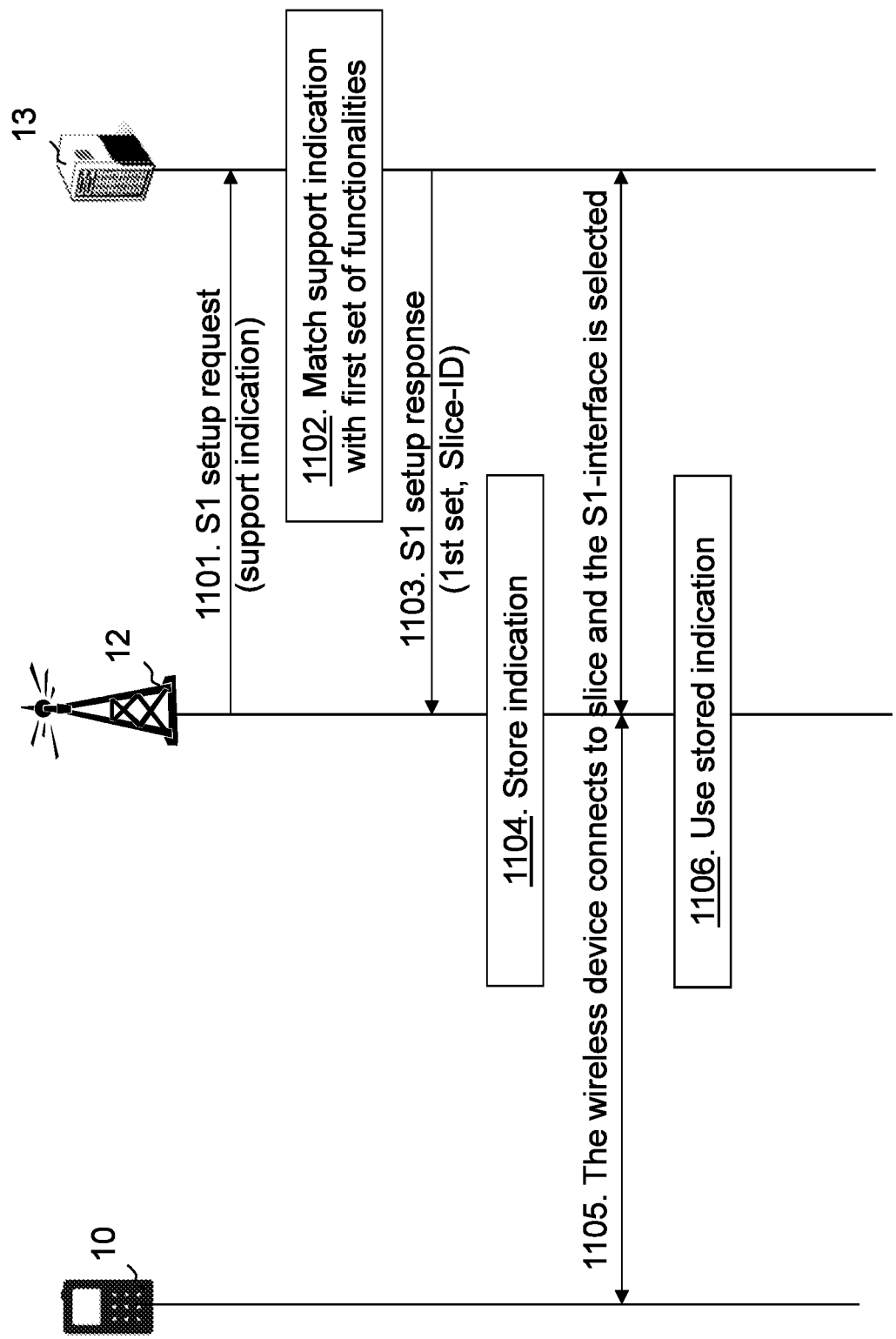
FIG. 11 is a combined flowchart and signalling scheme according to embodiments herein.

One technical solution for such a scenario is shown in FIG. 11. FIG. 11 is a combined flowchart and signalling scheme according to some embodiments herein exemplifying such a scenario.

Action 1101. When the radio network node 12 is taken into service, the radio network node 12 triggers the S1 Setup procedure towards one or more network nodes e.g. MMEs, by sending a S1 SETUP REQUEST. The S1 SETUP REQUEST includes the support indication indicating an own supported set of functionalities.

Action 1102. The first network node 13 may match the received support indication with the first set of functionalities. For example, as stated above, in case the first network node supports a number of network slices or sets of functionalities, the first network node 13 may receive the support indication indicating supported set of functionalities and select a set of functionalities, i.e. a network slice, which matches the supported set of functionalities.

Action 1103. The first network node 13 then responds with a S1 SETUP RESPONSE which includes the selected set of functionalities to use, e.g. the first set of functionalities, which could be a further down-selection of the set of functionalities in the support indication.

Action 1104. The radio network node 12 stores the received indication of the supported first set of functionalities and may associate this with the S1-interface for which the S1 Setup procedure was performed for. The association may also include the network slice identifier.

Action 1105. Then the wireless device 10 connects to the first network slice using the same S1-interface.

Action 1106. When the wireless device 10 connects to the first network slice the radio network node 12 uses the stored indication about the supported functionality to adapt to the first set of functionalities in the network slice.

Figure 12:
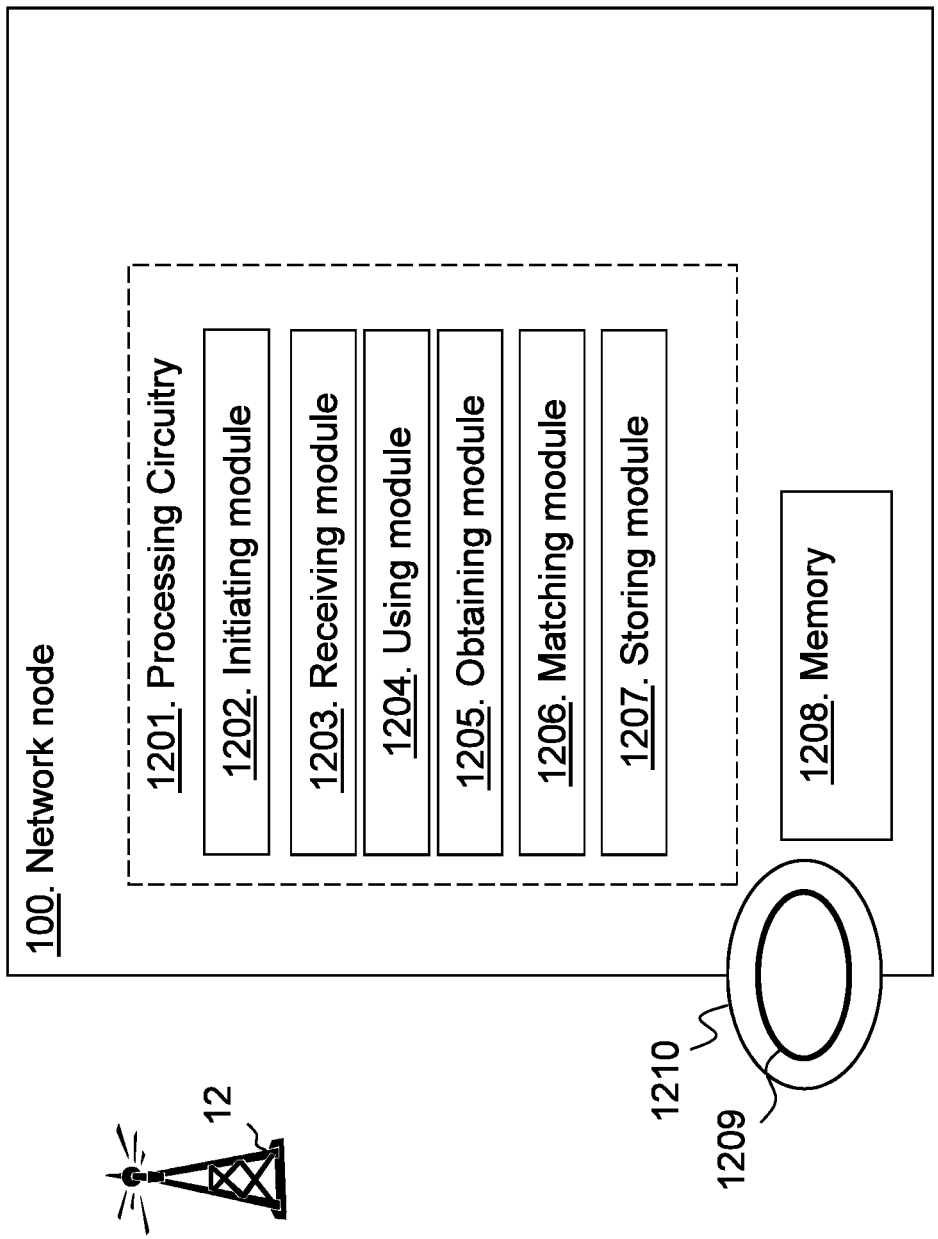
FIG. 12 is a block diagram depicting a network node according to embodiments herein.

In order to perform the methods herein a network node 100, such as the first network node 13, is provided. FIG. 12 shows the network node 100 for enabling communication between the network node 13 and the radio network node 12 comprised in the communication network 1. The network node 100 is configured to support the first set of functionalities out of the total set of functionalities in the communication network 1. The first set of functionalities is separated from a different set of functionalities out of the total set of functionalities in the communication network 1. The network node may be an MME, a SGSN, or a corresponding node. The network node 100 may comprise processing circuitry 1201 configured to perform the methods herein.

The network node 100 is configured to initiate the transmission of the indication to the radio network node 12, which indication indicates the supported first set of functionalities. The transmission may comprise the identity identifying the first set of functionalities, such as the first network slices ID. The first set of functionalities may be associated with a certain type of wireless devices, a certain enterprise, a certain operator or a certain agreement. The network node 100 may be configured to initiate the transmission during setup of the radio network node 12 or upon a modification of the radio network node 12.

The network node 100 may be configured to receive the connection request for the wireless device 10 from the radio network node 12 for the first set of functionalities, and to use at least one function of the first set of functionalities for the wireless device 10.

The network node 100 may further be configured to obtain the support indication of the radio network node 12, which support indication indicates an own set of functionalities supported by the radio network node 12.

The network node 100 may then be configured to match the received support indication with the first set of functionalities, and in that case the network node 13 is configured to perform the initiation.

The network node 100 may be configured to store the match indication indicating that the received support indication is matched with the first set of functionalities. Upon receiving a connection request for the wireless device 10 from the radio network node 12, the network node 13 is configured to check the stored match indication and use at least one function of the first set of functionalities for the wireless device 10.

The network node 100 may comprise an initiating module 1202. The processing circuitry 1201 and/or the initiating module 1202 may be configured to initiate the transmission of the indication to the radio network node 12, which indication indicates the supported first set of functionalities. The transmission may comprise the identity identifying the first set of functionalities, such as the first network slices ID. The processing circuitry 1201 and/or the initiating module 1202 may be configured to initiate the transmission during setup of the radio network node 12 or upon a modification of the radio network node 12.

The network node 100 may comprise a receiving module 1203. The processing circuitry 1201 and/or the receiving module 1203 may be configured to receive the connection request for the wireless device 10 from the radio network node 12 for the first set of functionalities. The network node 100 may comprise a using module 1204. The processing circuitry 1201 and/or the using module 1204 may be configured to use at least one function of the first set of functionalities for the wireless device 10.

The network node 100 may comprise an obtaining module 1205. The processing circuitry 1201 and/or the obtaining module 1205 may be configured to obtain the support indication of the radio network node 12, which support indication indicates an own set of functionalities supported by the radio network node 12.

The network node 100 may comprise a matching module 1206. The processing circuitry 1201 and/or the matching module 1206 may be configured to match the received support indication with the first set of functionalities, and in that case the processing circuitry 1201 and/or the initiating module 1202 may be configured to perform the initiation.

The network node 100 may comprise a storing module 1207. The processing circuitry 1201 and/or the storing module 1207 may be configured to store the match indication indicating that the received support indication is matched with the first set of functionalities. Upon receiving a connection request for the wireless device 10 from the radio network node 12, the processing circuitry 1201 and/or the using module 1204 is configured to check the stored match indication and use at least one function of the first set of functionalities for the wireless device 10.

The network node 100 further comprises a memory 1208. The memory comprises one or more units to be used to store data on, such as sets of functionalities, match indications, identities of network slices, support indications, S1 interface mappings to network slices, applications to perform the methods disclosed herein when being executed, and similar.

The methods according to the embodiments described herein for the network node 100 are respectively implemented by means of e.g. a computer program 1209 or a computer program product, comprising instructions, i.e., software code portions, which, when executed on at least one processor, cause the at least one processor to carry out the actions described herein, as performed by the network node 100. The computer program 1209 may be stored on a computer-readable storage medium 1210, e.g. a disc or similar. The computer-readable storage medium 1210, having stored thereon the computer program, may comprise the instructions which, when executed on at least one processor, cause the at least one processor to carry out the actions described herein, as performed by the network node 100. In some embodiments, the computer-readable storage medium may be a non-transitory computer-readable storage medium.

Figure 13:
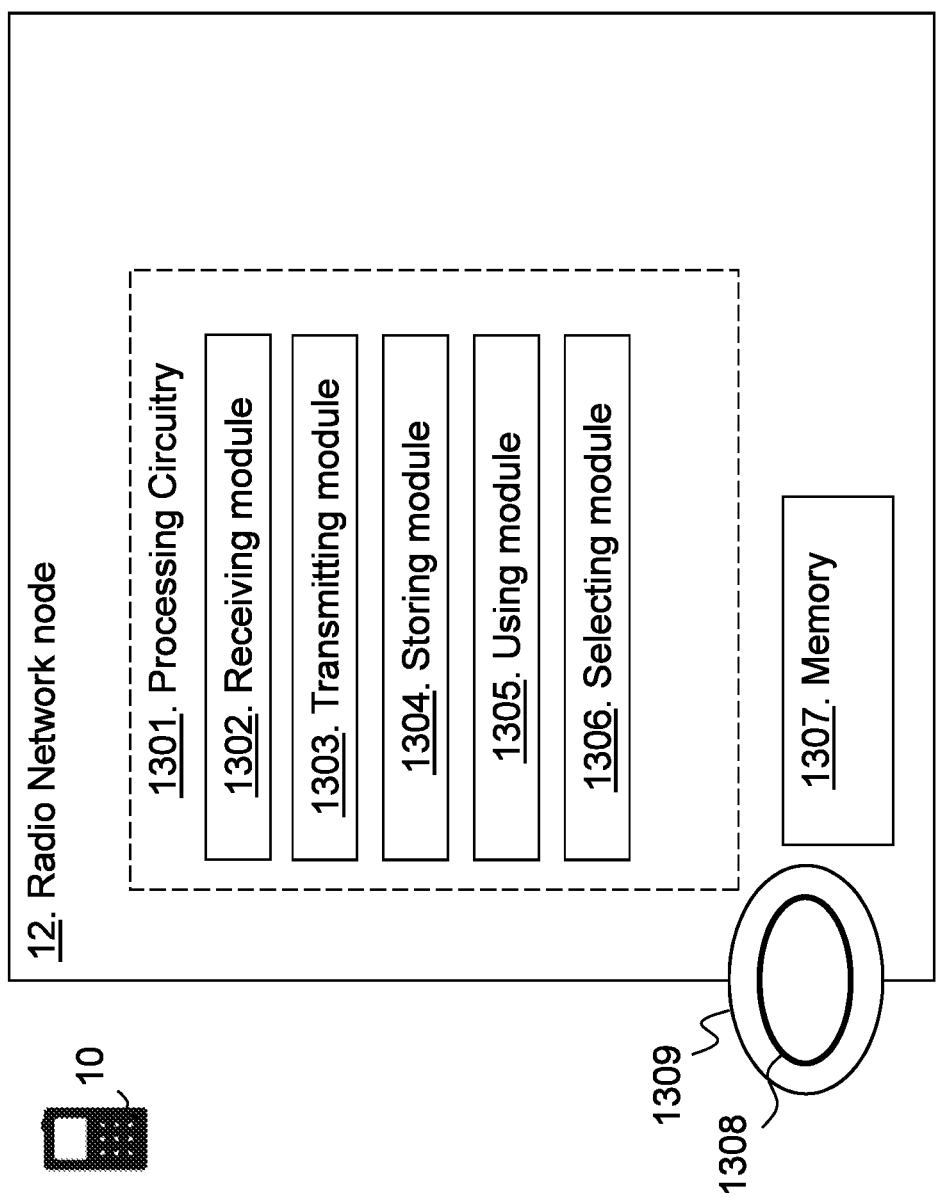
FIG. 13 is a block diagram depicting a radio network node according to embodiments herein.

In order to perform the methods herein the radio network node 12 is provided. FIG. 13 shows the radio network node 12 for enabling communication between the radio network node 12 and the network node 13 comprised in the communication network 1. The radio network node 12 may comprise processing circuitry 1301 configured to perform the methods herein.

The radio network node 12 is configured to receive the transmission of the indication from the network node 13. The indication indicates the supported first set of functionalities out of the total set of functionalities in the communication network 1. The first set of functionalities is separated from a different set of functionalities out of the total set of functionalities in the communication network 1. The transmission may comprise the identity identifying the first set of functionalities, e.g. the first network slice ID. The first set of functionalities may be associated a certain type of wireless devices, a certain enterprise, a certain operator or a certain agreement.

The radio network node 12 may be configured to support the own set of functionalities out of the total set of functionalities and may then further be configured to transmit the support indication to the network node 13, which support indication indicates the supported own set of functionalities.

The radio network node 12 may be configured to store the received indication. The radio network node 12 may further be configured to store the identity mapped to the first set of functionalities. Then during communication indicating the identity the radio network node will communicate with the network node 100 based on the sored mapping.

The radio network node 12 may further be configured to receive a connection request from the wireless device 10 for the first set of functionalities; and to use the received indication for enabling at least one function of the first set of functionalities for the wireless device 10 as response to the connection request. The wireless device 10 may e.g. send to the radio network node 12 the connection request with an identifier identifying the first set of functionalities, the identifier may be a device type identifier, a network slice identifier, or any identifier indicating the first set of functionalities.

The radio network node 12 may further be configured to receive the second transmission with the second indication from the second network node 14. The second indication indicates the supported second set of functionalities out of the total set of functionalities in the communication network 1. The second set of functionalities is separated from the first set of functionalities out of the total set of functionalities in the communication network 1. The radio network node 12 may then further be configured to receive the connection request from the wireless device 10 for the requested set of functionalities. The radio network node 12 may be configured to select to set up a connection to one of the network nodes based on the first, the second, and the requested set of functionalities.

The radio network node 12 may comprise a receiving module 1302. The processing circuitry 1301 and/or the receiving module 1302 may be configured to receive the transmission of the indication from the network node 13. The indication indicates the supported first set of functionalities out of the total set of functionalities in the communication network 1. The first set of functionalities is separated from a different set of functionalities out of the total set of functionalities in the communication network 1. The transmission may comprise the identity identifying the first set of functionalities, e.g. the first network slice ID.

The radio network node 12 may comprise a transmitting module 1303. The radio network node 12 may be configured to support the own set of functionalities out of the total set of functionalities and then the processing circuitry 1301 and/or the transmitting module 1303 may be configured to transmit the support indication to the network node 13, which support indication indicates the supported own set of functionalities.

The radio network node 12 may comprise a storing module 1304. The processing circuitry 1301 and/or the storing module 1304 may be configured to store the received indication. The processing circuitry 1301 and/or the storing module 1304 may further be configured to store the identity mapped to the first set of functionalities.

The radio network node 12 may comprise a using module 1305. The processing circuitry 1301 and/or the receiving module 1302 may be configured to receive a connection request from the wireless device 10 for the first set of functionalities, and the processing circuitry 1301 and/or the using module 1305 may then be configured to use the received indication for enabling at least one function of the first set of functionalities for the wireless device 10 as response to the connection request.

The radio network node 12 may comprise a selecting module 1306. The processing circuitry 1301 and/or the receiving module 1302 may be configured to receive the second transmission with the second indication from the second network node 14. The second indication indicates the supported second set of functionalities out of the total set of functionalities in the communication network 1. The second set of functionalities is separated from the first set of functionalities out of the total set of functionalities in the communication network 1. The processing circuitry 1301 and/or the receiving module 1302 may then further be configured to receive the connection request from the wireless device 10 for the requested set of functionalities. The processing circuitry 1301 and/or the selecting module 1306 may be configured to select to set up a connection to one of the network nodes based on the first, the second, and the requested set of functionalities.

The radio network node 12 further comprises a memory 1307. The memory comprises one or more units to be used to store data on, such as sets of functionalities, match indications, identities of network slices, support indications, S1 interface mappings to network slices, applications to perform the methods disclosed herein when being executed, and similar.

The methods according to the embodiments described herein for the radio network node 12 are respectively implemented by means of e.g. a computer program 1308 or a computer program product, comprising instructions, i.e., software code portions, which, when executed on at least one processor, cause the at least one processor to carry out the actions described herein, as performed by the radio network node 12. The computer program 1308 may be stored on a computer-readable storage medium 1309, e.g. a disc or similar. The computer-readable storage medium 1309, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

Embodiments herein relate to a network with network slices i.e. core network with partitioned sets of functionalities where network node 13 supports the first set of functionalities out of the total set of functionalities in the core network of the communication network. The first set of functionalities belongs to the first network slice of the core network, and is separated from another set of functionalities out of the total set of functionalities in the core network.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory.

Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for enabling communication between the network node and a radio network node comprised in a communication network, wherein the network node supports a first set of functionalities out of a total set of functionalities in the communication network, and wherein the supported first set of functionalities is separated from a different set of functionalities out of the total set of functionalities in the communication network, the method comprising:
    obtaining a support indication of the radio network node, wherein the support indication indicates an own set of functionalities supported by the radio network node;
    matching the obtained support indication with the supported first set of functionalities;
    storing a match indication indicating that the obtained support indication matches with the supported first set of functionalities; and
    when the obtained support indication matches with the supported first set of functionalities, initiating a transmission of an indication to the radio network node, wherein the indication indicates the supported first set of functionalities, and wherein the supported first set of functionalities comprises one or more of:
        active mode mobility support, wherein the active mode mobility support indicates whether the network node supports at least one of S1 and X2 based handovers, and
        information related to control plane and user plane split.

2. The method according to claim 1, further comprising:
    receiving a connection request for a wireless device, from the radio network node, for the supported first set of functionalities; and
    using at least one function of the supported first set of functionalities for the wireless device.

3. The method according to claim 1, further comprising upon receiving a connection request for a wireless device from the radio network node, checking the stored match indication and using at least one function of the supported first set of functionalities for the wireless device.

4. The method according to claim 1, wherein the transmission comprises an identity identifying the supported first set of functionalities.

5. The method according to claim 1, wherein the supported first set of functionalities is associated with type of wireless devices, an enterprise, an operator, or an agreement.

6. The method according to claim 1, wherein the initiating is performed during setup of the radio network node or upon a modification of the radio network node.

7. The method according to claim 1, wherein the network node is a Mobility Managing Entity, a Serving General Packet Radio Services Support Node, or a corresponding node.

8. A method performed by a radio network node for enabling communication between the radio network node and a network node comprised in a communication network, the method comprising:
    receiving a transmission of an indication from the network node, wherein the indication indicates a supported first set of functionalities out of a total set of functionalities in the communication network, wherein the supported first set of functionalities is separated from a different set of functionalities out of the total set of functionalities in the communication network, wherein the supported first set of functionalities is associated with type of wireless devices, and wherein the transmission comprises an identity identifying the supported first set of functionalities; and
    storing the received indication indicating the supported first set of functionalities, wherein the received indication is associated with the network node based on the identity identifying the supported first set of functionalities, and wherein the supported first set of functionalities comprises one or more of:
        active mode mobility support, wherein the active mode mobility support indicates whether the network node supports at least one of S1 and X2 based handovers, and
        information related to control plane and user plane split.

9. The method according to claim 8, wherein the radio network node supports an own set of functionalities out of the total set of functionalities and the method further comprises
    transmitting a support indication to the network node, wherein the support indication indicates the supported own set of functionalities.

10. The method according to claim 8, wherein the storing comprises storing the identity mapped to the supported first set of functionalities.

11. The method according to claim 8, further comprising:
    receiving a connection request, from a wireless device, for the supported first set of functionalities; and
    using the received indication for enabling at least one function of the supported first set of functionalities for the wireless device, as response to the received connection request.

12. The method according to claim 8, further comprising:
    receiving a second transmission of a second indication from a second network node, wherein the second indication indicates a supported second set of functionalities out of the total set of functionalities in the communication network, and wherein the supported second set of functionalities is separated from the supported first set of functionalities out of the total set of functionalities in the communication network;
    receiving a connection request, from a wireless device, for a requested set of functionalities, wherein the connection request comprises an identity identifying the requested set of functionalities; and
    selecting to set up a connection to one of the network node or the second network node based on the supported first set of functionalities, the supported second set of functionalities, and the requested set of functionalities.

13. The method according to claim 8, wherein the supported first set of functionalities is further associated with an enterprise, an operator, or an agreement.

14. A network node to enable communication between the network node and a radio network node comprised in a communication network, wherein the network node is configured to support a first set of functionalities out of a total set of functionalities in the communication network, and wherein the supported first set of functionalities is separated from a different set of functionalities out of the total set of functionalities in the communication network, the network node being configured to:

obtain a support indication of the radio network node, wherein the support indication indicates an own set of functionalities supported by the radio network node;

match the obtained support indication with the supported first set of functionalities;

store a match indication indicating that the obtained support indication matches with the supported first set of functionalities; and when the obtained support indication matches with the supported first set of functionalities, initiate a transmission of an indication to the radio network node, wherein the indication indicates the supported first set of functionalities, and wherein the supported first set of functionalities comprises one or more of:

active mode mobility support, wherein the active mode mobility support indicates whether the network node supports at least one of S1 and X2 based handovers, and information related to control plane and user plane split.

15. The network node according to claim 14, wherein the network node is further configured to:

receive a connection request for a wireless device, from the radio network node, for the supported first set of functionalities; and use at least one function of the supported first set of functionalities for the wireless device.

16. The network node according to claim 14, wherein the network node is further configured to upon reception of a connection request for a wireless device from the radio network node, check the stored match indication and use at least one function of the supported first set of functionalities for the wireless device.

17. The network node according to claim 14, wherein the transmission comprises an identity identifying the supported first set of functionalities.

18. The network node according to claim 14, wherein the supported first set of functionalities is associated with type of wireless devices, an enterprise, an operator, or an agreement.

19. The network node according to claim 14, wherein the network node is configured to initiate the transmission during setup of the radio network node or upon a modification of the radio network node.

20. The network node according to claim 14, wherein the network node is a Mobility Managing Entity, a Serving General Packet Radio Services Support Node, or a corresponding node.

21. A radio network node to enable communication between the radio network node and a network node comprised in a communication network, the radio network node being configured to:

receive a transmission of an indication from the network node, wherein the indication indicates a supported first set of functionalities out of a total set of functionalities in the communication network, wherein the supported first set of functionalities is separated from a different set of functionalities out of the total set of functionalities in the communication network, wherein the supported first set of functionalities is associated with type of wireless devices, and wherein the transmission comprises an identity identifying the supported first set of functionalities; and store the received indication indicating the supported first set of functionalities, wherein the received indication is associated with the network node based on the identity identifying the supported first set of functionalities, and wherein the supported first set of functionalities comprises one or more of:

active mode mobility support, wherein the active mode mobility support indicates whether the network node supports at least one of S1 and X2 based handovers, and information related to control plane and user plane split.

22. The radio network node according to claim 21, wherein the radio network node is configured to support an own set of functionalities out of the total set of functionalities and the radio network node is further configured to transmit a support indication to the network node, wherein the support indication indicates the supported own set of functionalities.

23. The radio network node according to claim 21, wherein the radio network node is configured to store the identity mapped to the supported first set of functionalities.

24. The radio network node according to claim 21, wherein the radio network node is further configured to:

receive a connection request, from a wireless device, for the supported first set of functionalities; and use the received indication to enable at least one function of the supported first set of functionalities for the wireless device, as response to the received connection request.

25. The radio network node according to claim 21, wherein the radio network node is further configured to:

receive a second transmission with a second indication from a second network node, wherein the second indication indicates a supported second set of functionalities out of the total set of functionalities in the communication network, and wherein the supported second set of functionalities is separated from the supported first set of functionalities out of the total set of functionalities in the communication network;

receive a connection request, from a wireless device, for a requested set of functionalities, wherein the connection request comprises an identity identifying the requested set of functionalities; and select to set up a connection to one of the network node or the second network node based on the supported first set of functionalities, the supported second set of functionalities, and the requested set of functionalities.

26. The radio network node according to claim 21, wherein the supported first set of functionalities is further associated with an enterprise, an operator, or an agreement.

27. A non-transitory computer-readable storage medium, having stored thereon a computer program comprising instructions which, when executed on at least one processor, cause the at least one processor to carry out the method according to claim 1, as performed by the network node.

\* \* \* \* \*